(12) United States Patent
Yoshikawa et al.

(10) Patent No.: US 10,947,647 B2
(45) Date of Patent: Mar. 16, 2021

(54) FABRIC FOR FIBER REINFORCED COMPOSITE MATERIAL AND FIBER REINFORCED COMPOSITE MATERIAL

(71) Applicant: KABUSHIKI KAISHA TOYOTA JIDOSHOKKI, Kariya (JP)

(72) Inventors: Genki Yoshikawa, Kariya (JP); Ryuta Kamiya, Kariya (JP); Shun Kuno, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 63 days.

(21) Appl. No.: 16/061,734

(22) PCT Filed: Dec. 8, 2016

(86) PCT No.: PCT/JP2016/086533
§ 371 (c)(1),
(2) Date: Jun. 13, 2018

(87) PCT Pub. No.: WO2017/110496
PCT Pub. Date: Jun. 29, 2017

(65) Prior Publication Data
US 2018/0371651 A1    Dec. 27, 2018

(30) Foreign Application Priority Data
Dec. 22, 2015 (JP) .............................. JP2015-249938

(51) Int. Cl.
*D03D 15/00* (2006.01)
*D03D 15/08* (2006.01)
(Continued)

(52) U.S. Cl.
CPC .......... *D03D 15/0011* (2013.01); *B29C 70/22* (2013.01); *B32B 5/024* (2013.01);
(Continued)

(58) Field of Classification Search
None
See application file for complete search history.

(56) References Cited

U.S. PATENT DOCUMENTS 4,574,108 A * 3/1986 Fakirov ................. B29C 70/10
428/221
5,731,084 A   3/1998 Smith
(Continued)

FOREIGN PATENT DOCUMENTS

CN    101454493 A    6/2009
JP    02-047332 A    2/1990
(Continued)

OTHER PUBLICATIONS

International Search Report for PCT/JP2016/086533 dated Mar. 7, 2017 [PCT/ISA/210].
(Continued)

*Primary Examiner* — Shawn Mckinnon
(74) *Attorney, Agent, or Firm* — Sughrue Mion, PLLC

(57) ABSTRACT

A fabric laminate used as a reinforcing base material of a fiber-reinforced composite is constituted by laminating fabrics having warp yarns and weft yarns. Each warp yarn has a diameter-changing portion, in which the diameter of the yarn gradually changes in the yarn longitudinal direction in the vicinity of one end in the yarn longitudinal direction of the warp yarn.

5 Claims, 3 Drawing Sheets

(51) Int. Cl.
*D03D 13/00* (2006.01)
*B32B 5/02* (2006.01)
*B32B 5/26* (2006.01)
*D03D 1/00* (2006.01)
*B29C 70/22* (2006.01)
*D02G 3/44* (2006.01)
*D02G 3/34* (2006.01)

(52) U.S. Cl.
CPC ............... *B32B 5/26* (2013.01); *D02G 3/34* (2013.01); *D02G 3/447* (2013.01); *D03D 1/00* (2013.01); *D03D 13/008* (2013.01); *D03D 15/00* (2013.01); *D03D 15/08* (2013.01); *D10B 2401/063* (2013.01); *D10B 2505/02* (2013.01)

(56) References Cited

U.S. PATENT DOCUMENTS

| | | | |
|---|---|---|---|
| 6,335,087 B1* | 1/2002 | Hourahane | D02G 3/447 428/293.4 |
| 2005/0009428 A1* | 1/2005 | Porter | B32B 5/02 442/129 |
| 2009/0169802 A1 | 7/2009 | Miyamura et al. | |

FOREIGN PATENT DOCUMENTS

| | | |
|---|---|---|
| JP | 04-000530 U | 1/1992 |
| JP | 2000-515589 A | 11/2000 |
| JP | 2003-027349 A | 1/2003 |
| JP | 2013-100609 A | 5/2013 |

OTHER PUBLICATIONS

Extended European Search Report dated Oct. 30, 2018 issued by the European Patent Office in counterpart application No. 16878388.4.
International Preliminary Report on Patentability with translation of Written Opinion dated Jun. 26, 2018 from the International Bureau in counterpart International Application No. PCT/JP2016/086533.

* cited by examiner

FABRIC FOR FIBER REINFORCED COMPOSITE MATERIAL AND FIBER REINFORCED COMPOSITE MATERIAL

CROSS REFERENCE TO RELATED APPLICATIONS

This application is a National Stage of International Application No. PCT/JP2016/086533 filed Dec. 8, 2016, claiming priority based on Japanese Patent Application No. 2015-249938 filed Dec. 22, 2015.

TECHNICAL FIELD

The present invention relates to a fabric for a fiber-reinforced composite using a fabric having warp yarns and weft yarns as a reinforcing base material and to a fiber-reinforced composite using the fabric as a reinforcing base material.

BACKGROUND ART

Fiber-reinforced composites are widely used as lightweight structural materials. A fiber-reinforced composite is constructed by impregnating a reinforcing base material made of a fabric with matrix resin. Fiber-reinforced composites are used as structural materials for rockets, airplanes, automobiles, ships, and buildings. There is also a fiber-reinforced composite the thickness of which is changed in accordance with the shape in use. A fiber-reinforced composite is impregnated with matrix resin along the shape of the reinforcing base material. For this reason, the thickness of the reinforcing base material varies with changes in the thickness of the fiber-reinforced composite.

Such reinforcing base materials include, for example, a fiber laminate disclosed in Patent Document 1. As shown in FIG. 6, a fiber laminate 80 is constituted by laminating reinforcing fiber sheets 81. The fiber laminate 80 has a base 82, an intermediate portion 83, and a surface layer portion 84. The base 82 is formed by laminating the reinforcing fiber sheets 81 to have a uniform thickness. In the intermediate portion 83, several reinforcing fiber sheets 81 are laminated with the ends thereof displaced relative to each other in a stepwise manner. The surface layer portion 84 covers the entire surface of the base 82 and the intermediate portion 83. The thickness of the fiber laminate 80 is changed gradually by displacing the ends of the reinforcing fiber sheets 81 relative to each other in the intermediate portion 83.

However, if the fiber layers are laminated with the ends thereof displaced relative to each other such that the thickness of the reinforcing base material is changed gradually as in Patent Document 1, the number of the fiber layers laminated in the thickness direction changes in positions in which the thickness changes, resulting in a stepwise shape. For this reason, in a fiber-reinforced composite in which a fiber laminate is impregnated with a matrix resin, portions in which only the matrix resin exists are formed in the stepped portions, that is, near the ends of the fiber layers. Such resin-rich portions reduce the strength of the fiber-reinforced composite.

PRIOR ART DOCUMENT

Patent Document

Patent Document 1: Japanese Laid-Open Utility Model Publication No. 4-530

SUMMARY OF THE INVENTION

Problems that the Invention is to Solve

Accordingly, it is an objective of the present invention to provide a fabric and a fiber-reinforced composite in which the strength of a portion where the thickness continuously changes is not easily reduced.

Means for Solving the Problems

To achieve the foregoing objective and in accordance with a first aspect of the present invention, a fabric for a fiber-reinforced composite is provided that uses, as a reinforcing base material, a fabric having a warp yarn and a weft yarn. At least one of the warp yarn and the weft yarn has a diameter-changing portion, in which a diameter of the yarn gradually changes in a yarn longitudinal direction.

To achieve the foregoing objective and in accordance with a second aspect of the present invention, a fiber-reinforced composite is provided that includes a reinforcing base material, which is made of a fabric having a warp yarn and a weft yarn and is impregnated with a matrix resin. The fabric is the above-described fabric for a fiber-reinforced composite.

MODES FOR CARRYING OUT THE INVENTION

First Embodiment

A fabric for a fiber-reinforced composite and a fiber-reinforced composite according to a first embodiment of the present invention will now be described with reference to FIGS. 1 to 3.

Figure 1:
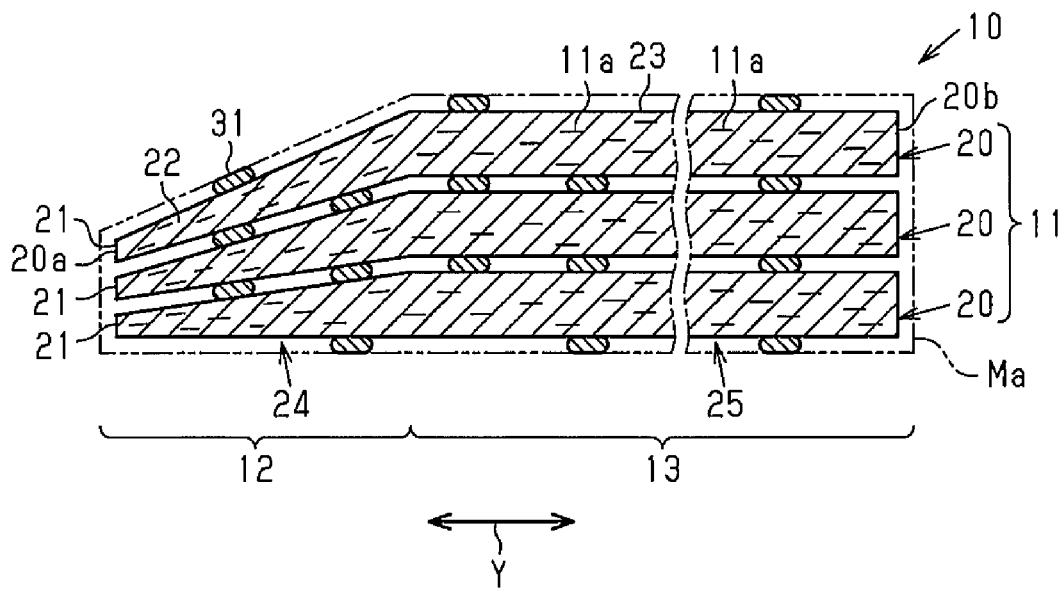
FIG. 1 is a cross-sectional side view illustrating a fiber-reinforced composite according to a first embodiment of the present invention.

As shown in FIG. 1, a fiber-reinforced composite 10 is formed by impregnating a fabric laminate 11, which is a reinforcing base material, with matrix resin Ma. The fabric laminate 11 is constituted by laminating three fabrics 20.

Figure 2:
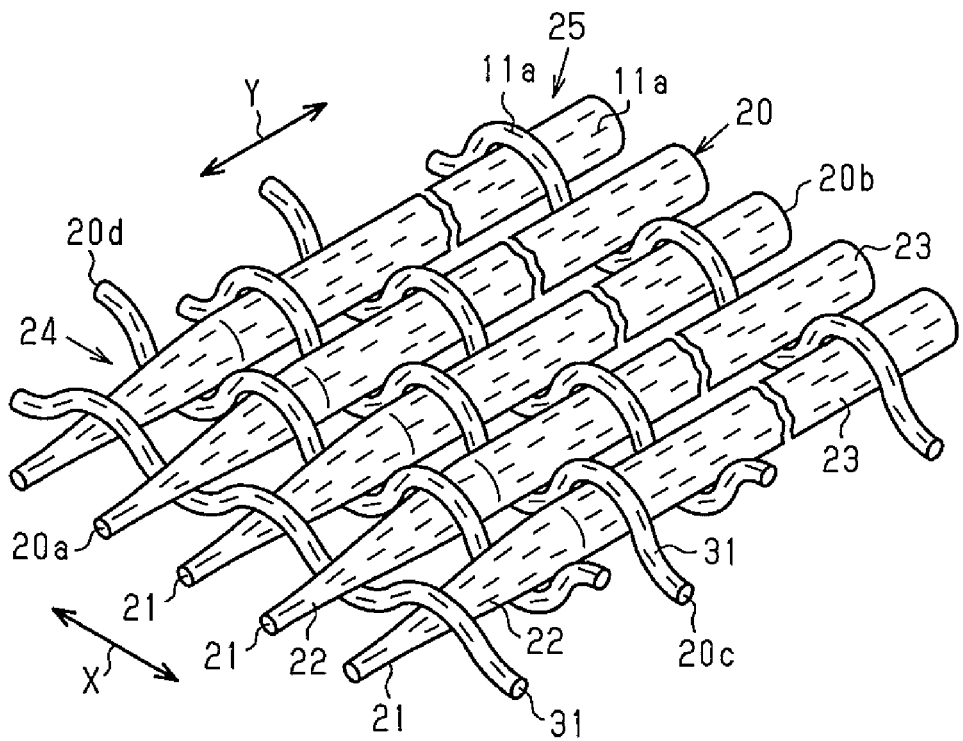
FIG. 2 is a perspective view of a fabric according to the first embodiment.
Figure 3:
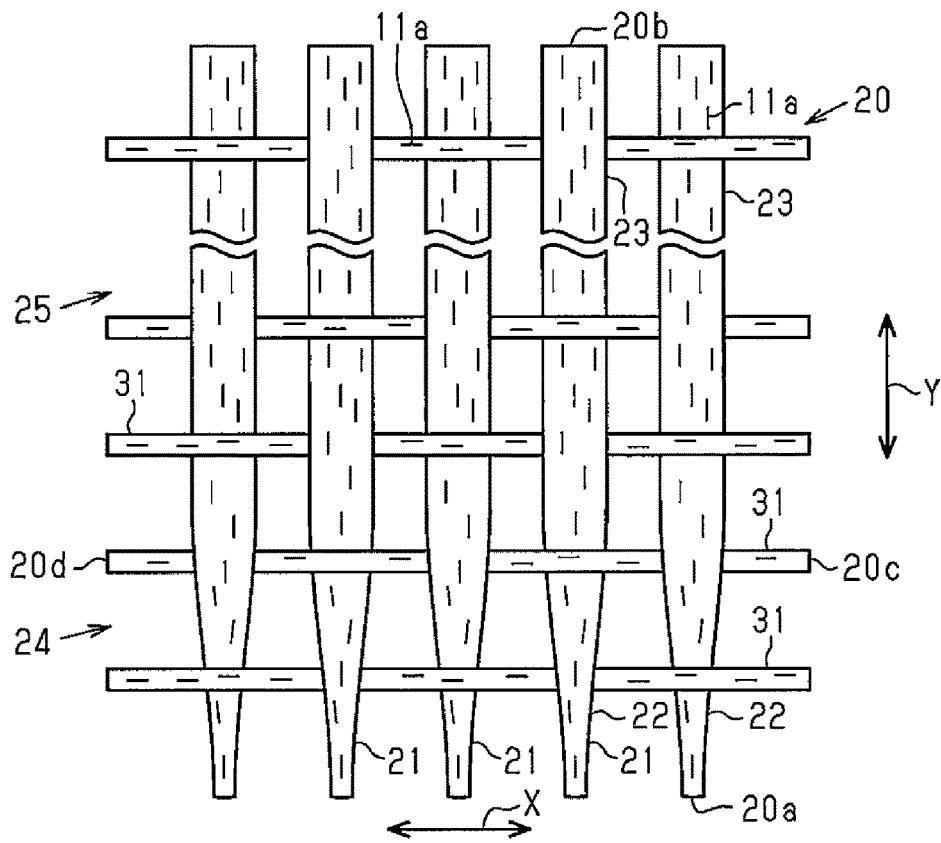
FIG. 3 is a plan view of a fabric according to the first embodiment.

As shown in FIGS. 2 and 3, each fabric 20 is a combination of warp yarns 21 and weft yarns 31, and has a rectangular shape in a plan view. The warp yarns 21 and the weft yarns 31 are formed by spinning discontinuous fibers 11a. The warp yarns 21 and the weft yarns 31 are made of carbon fibers, but they may be made of glass fibers or plastic fibers.

The warp yarns 21 are arranged in a first direction X of the fabric 20. The warp yarns 21 are parallel with each other. The yarn longitudinal direction of the warp yarns 21 coincides with a second direction Y, which is orthogonal to the first direction X. The fabric 20 has a first edge 20a, at which the ends of the warp yarns 21 on one side in the yarn longitudinal direction are aligned. The fabric 20 also has a second edge 20b, at which the ends of the warp yarns 21 on the other side in the yarn longitudinal direction are aligned. The fabric 20 has a third edge 20c, at which the ends of the weft yarns 31 on one side in the yarn longitudinal direction are aligned. The fabric 20 further has a fourth edge 20d, at which the ends of the weft yarns 31 on the other side in the yarn longitudinal direction are aligned.

The warp yarns 21 each have a diameter-changing portion 22 in the vicinity of one end in the yarn longitudinal direction. The length of the diameter-changing portion 22 is set in accordance with the length of a thickness-changing portion 12 of the fiber-reinforced composite 10. The diameter-changing portion 22 gradually becomes larger in diameter from one end to the other end in the yarn longitudinal direction. The warp yarn 21 also has a standard portion 23, the diameter of which is constant regardless of the position in the yarn longitudinal direction. The standard portion 23 has a standard diameter of the warp yarn 21, which is greater than the diameter of the diameter-changing portion 22. Thus, the diameter of the warp yarn 21 gradually increases from one end to the other in the yarn longitudinal direction in the diameter-changing portion 22 and is constant in the standard portion 23.

The warp yarns 21 are produced from a fiber bundle of the discontinuous fibers 11a using a special yarn manufacturing apparatus (not shown). The fiber bundle is a material with discontinuous fibers 11a aligned parallel to have a certain diameter. The special yarn manufacturing apparatus is basically constructed the same as a ring spinning frame. The special yarn manufacturing apparatus has front rollers and back rollers. The front rollers and the back rollers are driven by separate variable-speed motors. By changing the circumferential speeds of the front rollers and the back rollers, the desired draft ratio is achieved.

The diameter-changing portion 22 is produced when a warp yarn 21 is spun from the fiber bundle and wound about a bobbin. At this time, the circumferential speed of the front rollers is continuously increased to be greater than that of the back rollers while maintaining a constant circumferential speed of the back rollers, so that the diameter of the warp yarn 21 that passes through the front rollers becomes gradually smaller than that when the warp yarn 21 passes through the back rollers.

Then, the discontinuous fibers 11a of the fiber bundle are stretched so that the diameter of the spun yarn gradually decreases toward the downstream side in the spinning direction. As a result, the diameter of the warp yarn 21 is gradually decreased, and the diameter-changing portion 22 is produced. Also, since the draft ratio of the fiber bundle becomes lower toward the upstream side in the spinning direction, the diameter of the warp yarn 21 approaches the diameter of the fiber bundle before being stretched. After the diameter-changing portion 22 is formed, the circumferential speed of the front rollers is equalized with that of the back rollers to make the draft ratio constant so that the standard portion 23 having a constant diameter is produced.

The diameter of the weft yarns 31 is constant regardless of the position in the yarn longitudinal direction and is smaller than that of the warp yarns 21. In the fabric 20, the warp yarns 21 and the weft yarns 31 are joined together through the plain weave to form a single fiber layer. In the fabric 20, the interval between the warp yarns 21 arranged in the first direction X is constant, and the interval between the weft yarns 31 arranged in the second direction Y is constant.

Each fabric 20 includes an inclined portion 24 and a flat portion 25. The inclined portion 24 and the flat portion 25 are continuous in the second direction Y. The thickness of the inclined portion 24 continuously and smoothly increases in the second direction Y from the first edge 20a toward the second edge 20b. In contrast, the thickness of the flat portion 25 is constant regardless of the position in the first direction X. The inclined portion 24 is formed by weaving the diameter-changing portions 22 of the warp yarns 21 and the weft yarns 31 together. The inclined portion 24 is formed by gradually changing the diameter of the diameter-changing portions 22 in the second direction Y. Therefore, in the inclined portion 24, the amount of the discontinuous fibers 11a increases in the second direction Y from the first edge 20a toward the second edge 20b. In contrast, the thickness of the inclined portion 24 does not change in the first direction X. Accordingly, in the inclined portion 24, the amount of discontinuous fibers 11a is constant regardless of the position in the first direction X.

The flat portion 25 is formed by weaving the standard portions 23 of the warp yarns 21 and the weft yarns 31 together in the fabric 20. The thickness of the flat portion 25 is constant regardless of the positions in the first direction X and the second direction Y. Thus, in the flat portion 25, the amount of the discontinuous fibers 11a is also constant regardless of the positions in the first direction X and the second direction Y.

The fabric laminate 11 is constituted by laminating three fabrics 20 in the thickness direction of the fabrics 20 in a state in which the first edges 20a, the second edges 20b, the third edges 20c, and the fourth edges 20d of the fabrics 20 are aligned respectively. The fabric laminate 11 includes a portion in which the inclined portions 24 are laminated and a portion in which the flat portions 25 are laminated.

The fiber-reinforced composite 10 is produced by impregnating the produced fabric laminate 11 with a thermosetting matrix resin Ma and curing the resin Ma. The resin transfer molding (RTM) method is used to impregnate and cure the matrix resin Ma.

As shown in FIG. 1, the fiber-reinforced composite 10 has a thickness-changing portion 12, which corresponds to the inclined portions 24 of the fabric laminate 11, and a main portion 13, which corresponds to the flat portions 25. The fabric laminate 11 is formed into a desired shape by laminating and pressing the three fabrics 20.

As with the inclined portions 24, the thickness of the thickness-changing portion 12 gradually increases from the first edge 20a toward the second edge 20b in the second direction Y. Thus, as the thickness of the thickness-changing portion 12 increases in the second direction Y, the diameters of the warp yarns 21 gradually increase. Therefore, in the thickness-changing portion 12, the amount of discontinuous fibers 11a increases as the thickness increases in the second direction Y.

The thickness of the thickness-changing portion 12 does not change in the first direction X. Therefore, the diameters of the warp yarns 21 arranged in the in the first direction X are the same in correspondence with the constant thickness of the thickness-changing portion 12 in the first direction X. Also, the diameters of the weft yarns 31 are the same regardless of the position in the first direction X. Like the flat portions 25, the thickness of the main portion 13 and the amount of the discontinuous fibers 11a are also constant both in the first direction X and the second direction Y.

Next, an operation of fiber-reinforced composite 10 and the fabric laminate 11 will be described.

The inclined portions 24 of the fabric laminate 11 and the thickness-changing portion 12 of the fiber-reinforced composite 10 are formed by the diameter-changing portions 22, in which the diameters of the warp yarns 21 of the fabrics 20 are gradually changed. That is, the ends of the laminated fabrics 20 are not displaced relative to each other in order to gradually change the thickness of the inclined portions 24 and the thickness of the thickness-changing portions 12.

The first embodiment has the following advantages.

(1) The inclined portion 24 of the fabric 20 is formed by the diameter-changing portions 22, in which the diameters of the warp yarns 21 are changed gradually. For this reason, in the fiber-reinforced composite 10, which uses the fabric laminate 11 having the laminated fabrics 20 as the reinforcing base material, there is no need to displace the ends of the laminated fabrics 20 relative to each other in order to gradually change the thickness of the thickness-changing portion 12. Thus, a resin-rich portion in which only the matrix resin Ma exists is unlikely to be formed in the vicinity of the ends of the respective fabrics 20. Therefore, the strength of the thickness-changing portion 12 of the fiber-reinforced composite 10 is unlikely to be lowered.

(2) The fabric laminate 11 is constituted by laminating multiple fabrics 20. The thickness-changing portion 12 is formed by laminating portions in which the diameter-changing portions 22 are woven. Therefore, the thickness of the thickness-changing portion 12 can be adjusted by adjusting the number of fabrics 20 to be laminated.

(3) The fabric 20 is formed by weaving the warp yarns 21 and the weft yarns 31 together. The warp yarns 21 each have a diameter-changing portion 22. The diameter of the diameter-changing portion 22 increases in the second direction Y from the first edge 20a toward the second edge 20b. This configuration increases the strength of the fiber-reinforced composite 10 from the first edge 20a toward the second edge 20b.

(4) The diameter-changing portion 22 of the warp yarn 21 is produced by continuously adjusting the draft ratio when the warp yarns 21 is spun from a fiber bundle of the discontinuous fibers 11a by a special yarn manufacturing apparatus. Therefore, it is possible to easily produce the warp yarns 21 in which the diameter gradually changes.

Second Embodiment

Next, a fabric for a fiber-reinforced composite and a fiber-reinforced composite according to a second embodiment of the present invention will be described with reference to FIGS. 4 and 5. The detailed description of the configuration of the second embodiment that is the same as the first embodiment will be omitted.

Figure 4:
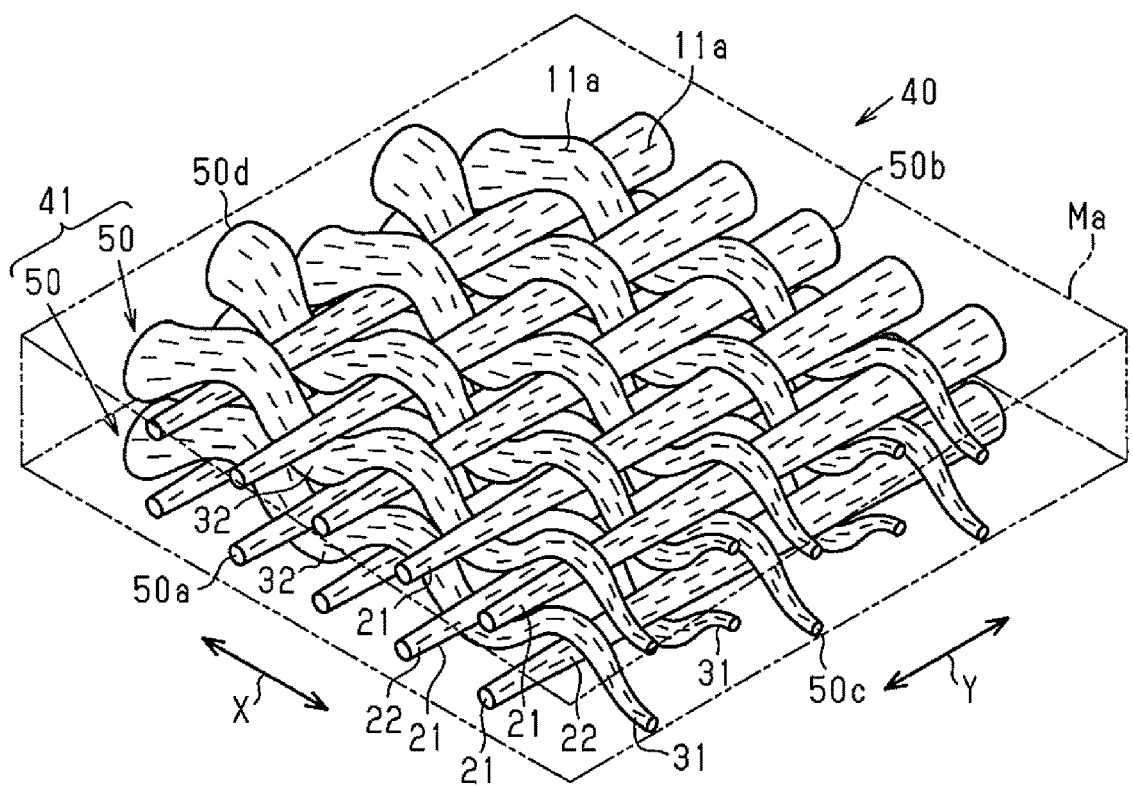
FIG. 4 is a perspective view illustrating a fiber-reinforced composite according to a second embodiment of the present invention.

As shown in FIG. 4, a fiber-reinforced composite 40 of the second embodiment is formed by impregnating a fabric laminate 41, which is a reinforcing base material, with matrix resin Ma. The fabric laminate 41 is constituted by laminating two fabrics 50.

Figure 5:
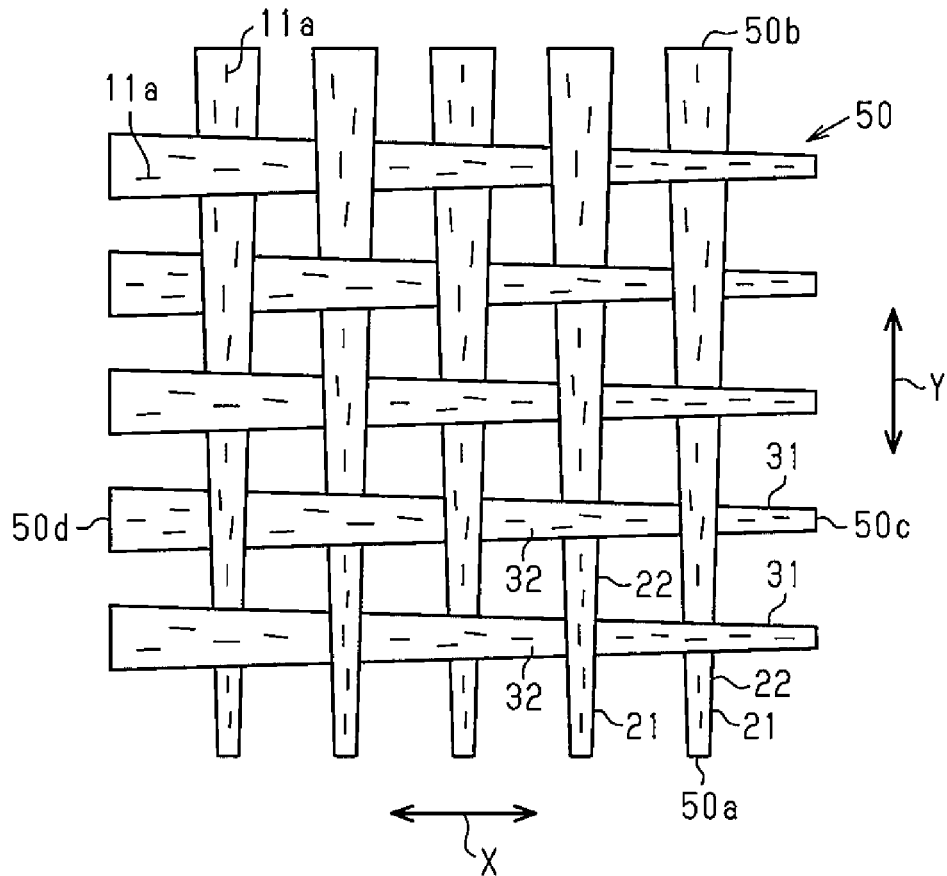
FIG. 5 is a plan view of a fabric according to the second embodiment.
Figure 6:
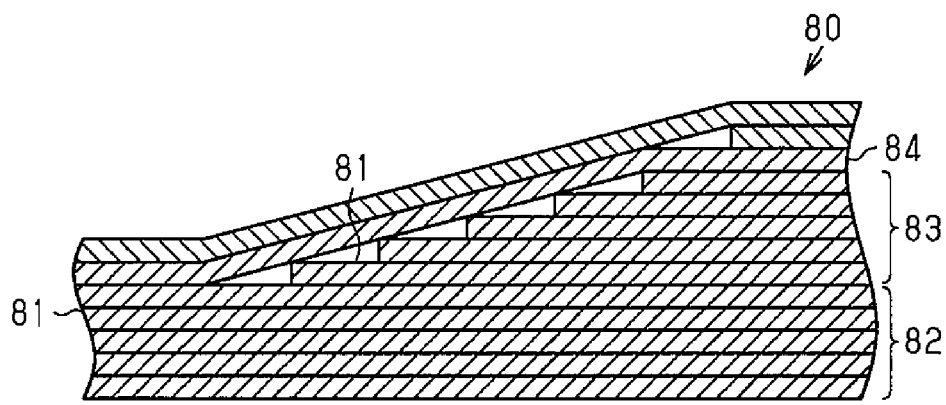
FIG. 6 is a cross-sectional view showing the background art.

As shown in FIG. 5, each fabric 50 is a combination of warp yarns 21 and weft yarns 31. The warp yarns 21 each have a diameter-changing portion 22. Each weft yarn 31 also has a diameter-changing portion 32. In the fabric 50, the warp yarns 21 and the weft yarns 31 are joined together through the plain weave to form a single fiber layer. In the fabric 50, the interval between the warp yarns 21 arranged in the first direction X is constant, and the interval between the weft yarns 31 arranged in the second direction Y is constant. The fabric 50 has a first edge 50a, at which the ends of the warp yarns 21 on one side in the yarn longitudinal direction are located. The fabric 50 has a second edge 50b, at which the ends of the warp yarns 21 on the other side in the yarn longitudinal direction are located. The fabric 20 has a third edge 50c, at which the ends of the weft yarns 31 on one side in the yarn longitudinal direction are located. The fabric 50 has a fourth edge 50d, at which the ends of the weft yarns 31 on the other side in the yarn longitudinal direction are located.

As shown in FIG. 4, each fabric 50 is inclined as a whole. Thus, the entire fabric 50 is an inclined portion. The thickness of the fabric 50 continuously increases in the second direction Y from the first edge 50a toward the second edge 50b and continuously increases in the first direction X from the third edge 50c toward the fourth edge 50d.

The fabric laminate 41 is constituted by laminating two fabrics 50 in the thickness direction of the fabrics 50 in a state in which the first edges 50a, the second edges 50b, the third edges 50c, and the fourth edges 50d of the fabrics 50 are aligned respectively. The thickness of the fabric laminate 41 gradually changes in correspondence with gradual changes in the diameters of the diameter-changing portions 22, 32 in the first direction X and the second direction Y. Thus, in the fabric laminate 41, the amount of the discontinuous fibers 11a changes in the first direction X and the second direction Y.

The fiber-reinforced composite 40 is produced by impregnating the produced fabric laminate 41 with a thermosetting matrix resin Ma and curing the resin Ma. The resin transfer molding (RTM) method is used to impregnate and cure the matrix resin Ma.

The fiber-reinforced composite 40 uses the fabric laminate 41, which is inclined as a whole, as the reinforcing base material. Thus, the entire fiber-reinforced composite 40 is a thickness-changing portion. The thickness of the fiber-reinforced composite 40 continuously increases in the first direction X from the third edge 50c toward the fourth edge 50d. Also, the thickness of the fiber-reinforced composite 40 gradually increases in the second direction Y from the first edge 50a toward the second edge 50b. Thus, the diameters of the warp yarns 21 and the weft yarns 31 gradually increase in correspondence with the increase in the thickness of the fiber-reinforced composite 40 in the first direction X and the second direction Y. In the fiber-reinforced composite 40, the amount of discontinuous fibers 11a increases as the thickness increases in the first direction X and the second direction Y.

In addition to the advantages of the first embodiment, the second embodiment achieves the following advantage.

(5) The fabric 50 is formed by weaving the warp yarns 21 and the weft yarns 31 together. The warp yarns 21 each have a diameter-changing portion 22, and the weft yarns 31 each have a diameter-changing portion 32. Thus, the thicknesses of the fabric laminate 41 and the fiber-reinforced composite 40 gradually change in the first direction X and the second direction Y. Therefore, the strength of the fiber-reinforced composite 40 can be increased as the thickness increases in two directions, which are the first direction X and the second direction Y.

The above-described embodiments may be modified as follows.

In each embodiment, the number of fabrics 20, 50 to be laminated may be changed as necessary in accordance with the thickness required for fiber-reinforced composites 10, 40. In addition, the laminated fabrics may include ones with warp yarns and weft yarns that have no diameter-changing portions.

In each embodiment, the fiber-reinforced composites 10, 40 may use only one fabric 20, 50 as a reinforcing base material.

In each embodiment, the warp yarns 21 and the weft yarns 31 are produced from the discontinuous fibers 11a. However, the warp yarns 21 and the weft yarns 31 may be produced from continuous fibers. In this case, fiber pieces obtained by cutting the continuous fibers may be bonded to the continuous fibers to form diameter-changing portions 22, 32.

In the second embodiment, each weft yarn 31 is located between warp yarns 21 that are adjacent to each other in the first direction X. However, the diameter of only the portion of each weft yarn 31 that is located between the adjacent warp yarns 21 may be reduced so that the interval between the warp yarns 21 is not widened in the first direction X.

In each embodiment, the reinforcing base materials are the fabric laminates 11, 41, which are obtained by laminating multiple fabrics 20, 50. However, the reinforcing base material may be a multilayer fabric that is obtained by simultaneously weaving warp fiber layers in which warp yarns 21 are arranged and weft fiber layers in which weft yarns 31 are arranged.

In each embodiment, the fabric laminates 11, 41 are formed by laminating the fabrics 20, 50. However, the fabric laminates 11, 41 may be formed by joining fabric laminates 11, 41 in the thickness direction with joining yarns.

In the second embodiment, the warp yarns 21 may each include a standard portion 23 in addition to the diameter-changing portion 22, and the weft yarns 31 may each include a standard portion in addition to the diameter-changing portion 32. In this case, the fabric 50 of the second embodiment may have both an inclined portion and a flat portion.

The positions of the diameter-changing portions 22, 32 in the warp yarns 21 and the weft yarns 31 are not limited to the vicinity of ends on one side in the yarn longitudinal direction of warp yarns 21 and weft yarns 31. The positions of the diameter-changing portions 22, 32 may be changed in accordance with the position of the thickness-changing portions 12 in the fiber-reinforced composites 10, 40.

In the first embodiment, the warp yarns 21 each have a diameter-changing portion 22. However, the weft yarns 31 may have a diameter-changing portion and the diameter of the warp yarns 21 may be constant.

A diameter-changing portion provided in at least one of the warp yarn 21 and the weft yarn 31 may be shaped as a slub (lump) the diameter of which is greater than that of the standard portion. The thickness of the fabric may be partly increased by weaving diameter-changing portions in a part the thickness of which is desired to be greater than the other parts. This configuration allows the thickness of the fabric to be controlled by controlling the arrangement and the diameters of the diameter-changing portions, without increasing the number of laminated fiber layers.

The weaving method for the fabrics 20, 50 may be twill weave or satin weave in addition to plain weave.

The invention claimed is:

1. A fiber-reinforced composite, comprising: a reinforcing base material, which is made of a fabric having a warp yarn and a weft yarn, wherein
    at least one of the warp yarn and the weft yarn has a diameter-changing portion, in which a diameter of the yarn gradually changes in a yarn longitudinal direction,
    the yarn that has the diameter-changing portion is made of discontinuous fibers,
    the reinforcing base material is impregnated with a matrix resin, and
    the fiber-reinforced composite has or is a thickness-changing portion, in which a thickness of the fiber-reinforced composite gradually changes in correspondence with a gradual change in a diameter of the diameter-changing portion, and
    a thickness of the fiber-reinforced composite increases in the yarn longitudinal direction from a first edge of the fiber-reinforced composite to a second edge of the fiber-reinforced composite.

2. The fiber-reinforced composite according to claim 1, wherein the reinforcing base material is constituted by laminating a plurality of fabrics in a thickness direction of each fabric.

3. The fiber-reinforced composite according to claim 1, wherein the warp yarn has the diameter-changing portion.

4. The fiber-reinforced composite according to claim 1, wherein the warp yarn and the weft yarn each have the diameter-changing portion.

5. The fiber-reinforced composite according to claim 1, wherein the weft yarn has the diameter-changing portion.

* * * * *